Aug. 22, 1944.　　F. MAYER ET AL　　2,356,526
RIVETING MACHINE
Filed Nov. 12, 1941　　10 Sheets-Sheet 1
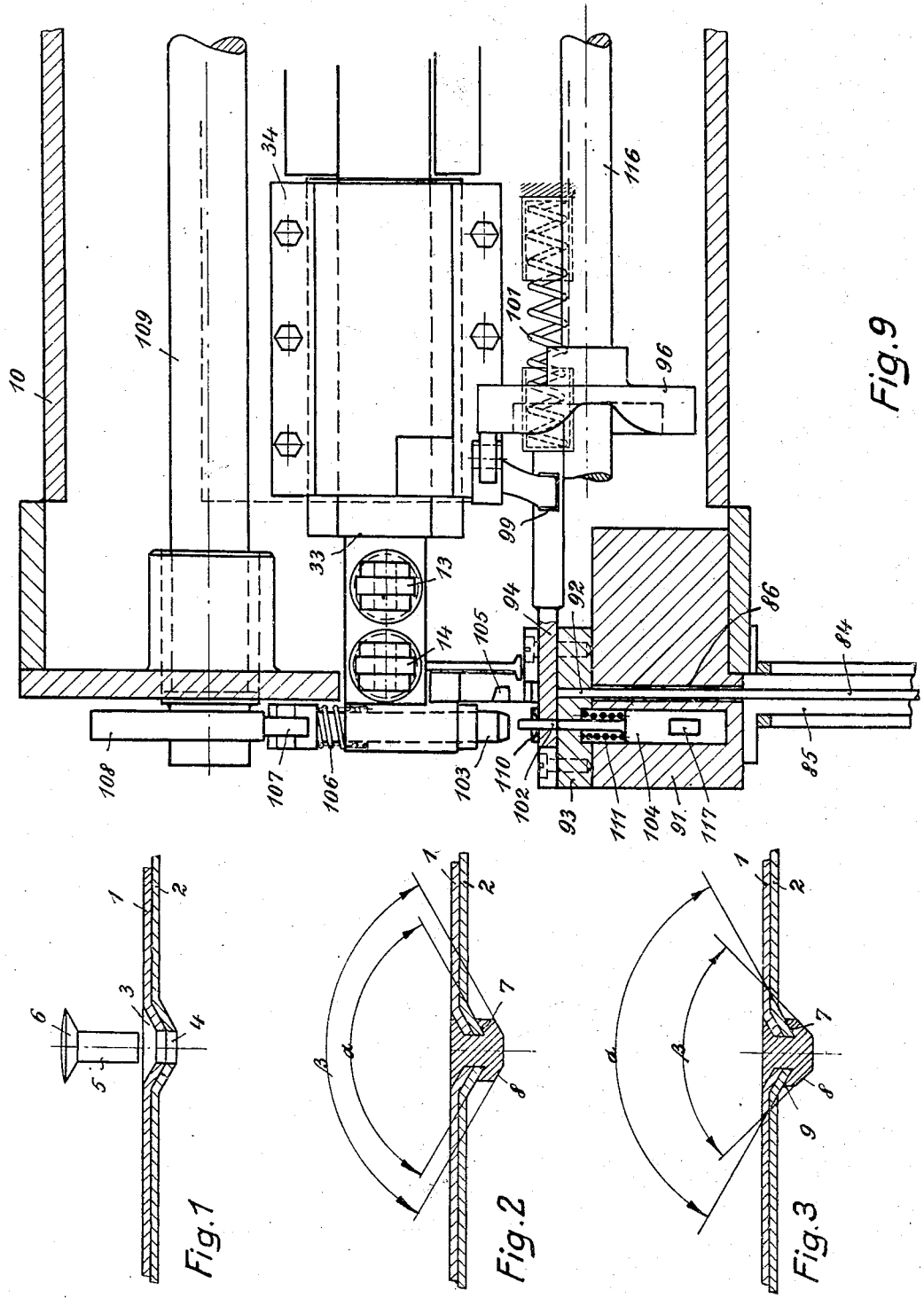
Inventors,
F. Mayer & F. Wopper
By: Glascock Downing & Seebold
Attys Aug. 22, 1944.  F. MAYER ET AL  2,356,526
RIVETING MACHINE
Filed Nov. 12, 1941  10 Sheets-Sheet 3

Inventors,
F. Mayer & F. Wopper
By Glascock Downing & Seebold
Attys.

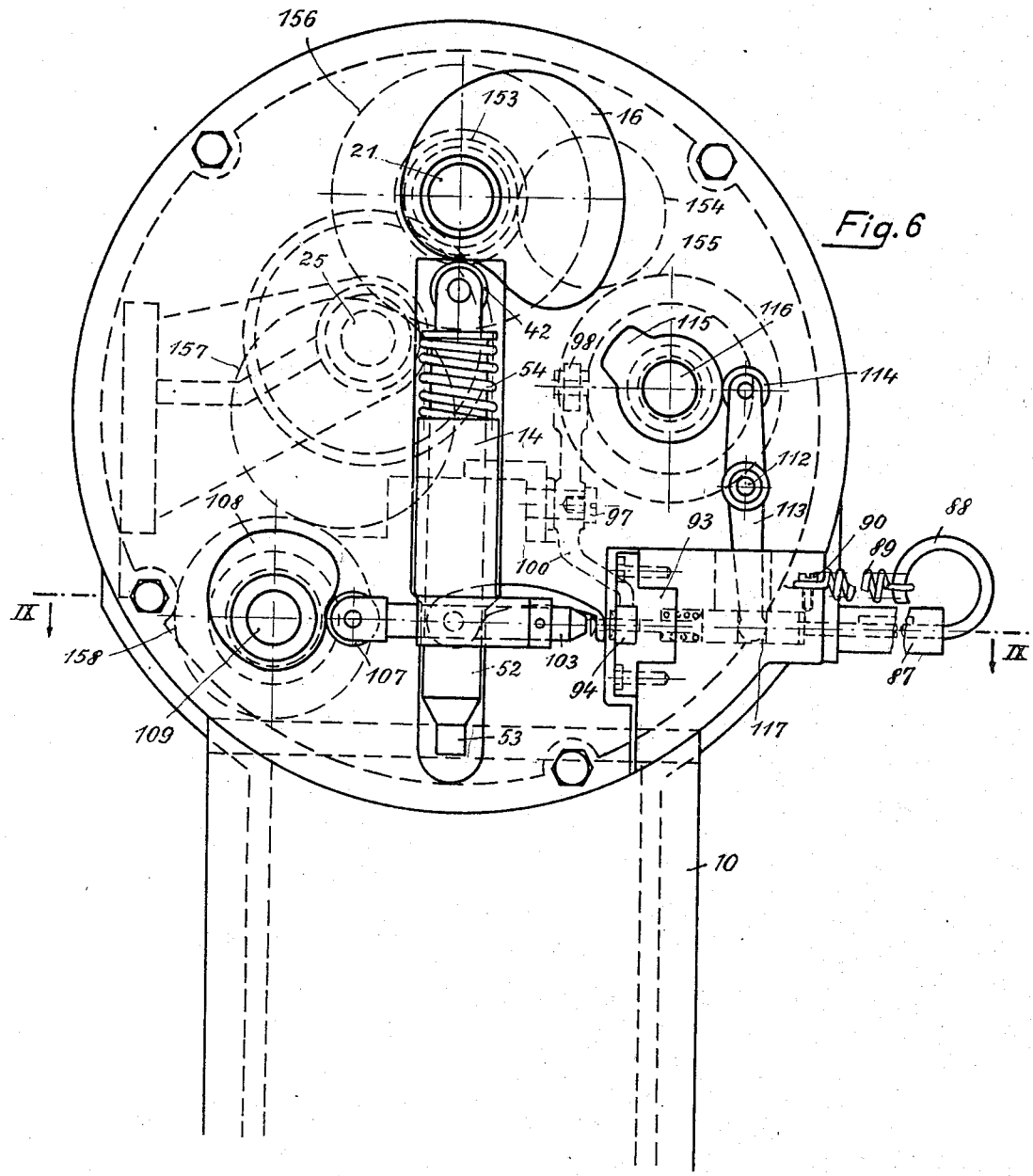

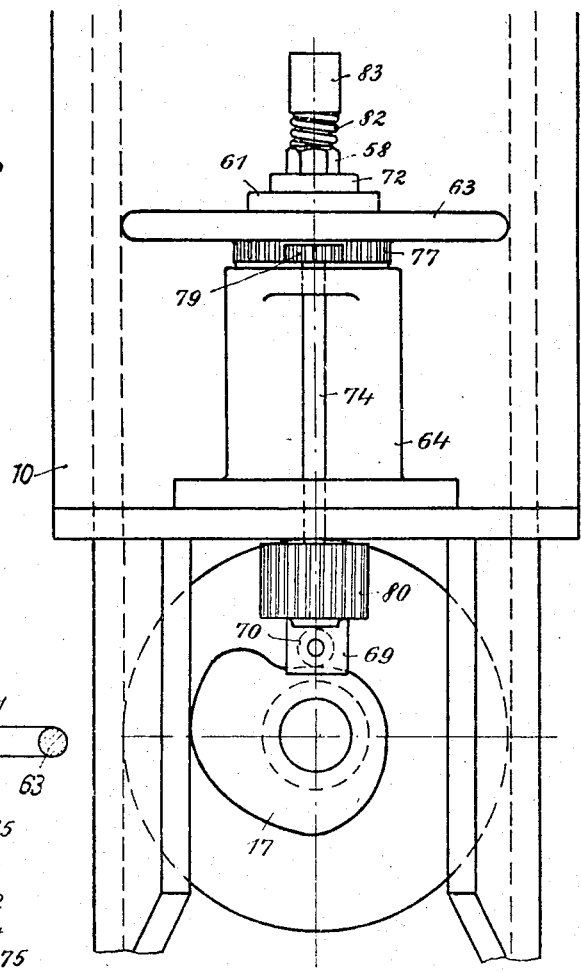

Aug. 22, 1944.　　　F. MAYER ET AL　　　2,356,526
RIVETING MACHINE
Filed Nov. 12, 1941　　　10 Sheets-Sheet 6

Inventors,
F. Mayer & F. Wopper
By: Glascock Downing Seibold
Attys.

Aug. 22, 1944.   F. MAYER ET AL   2,356,526
RIVETING MACHINE
Filed Nov. 12, 1941   10 Sheets-Sheet 8

Inventors
F. Mayer & F. Wopper
By: Glascock Downing & Seebold
Attys.

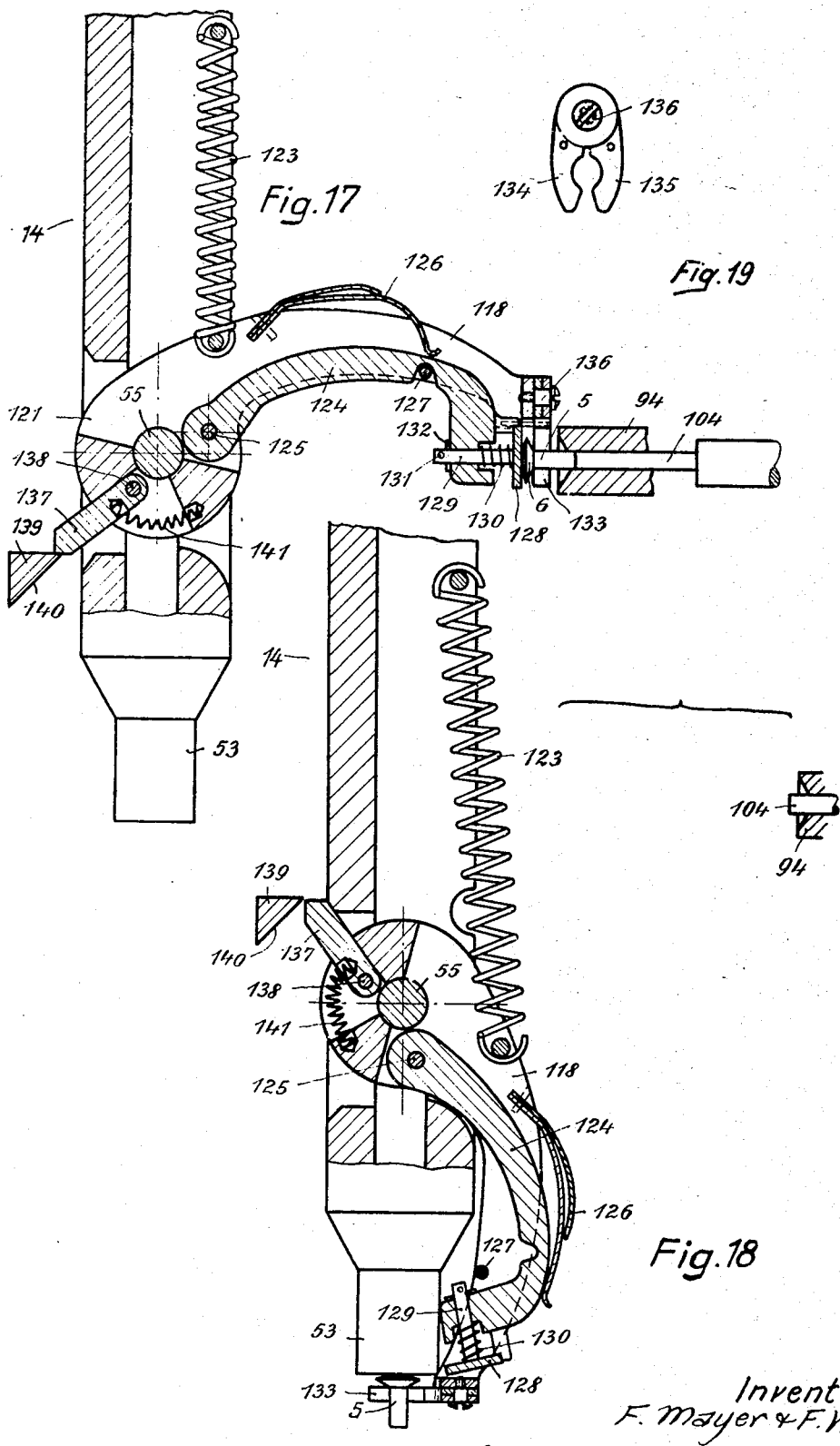

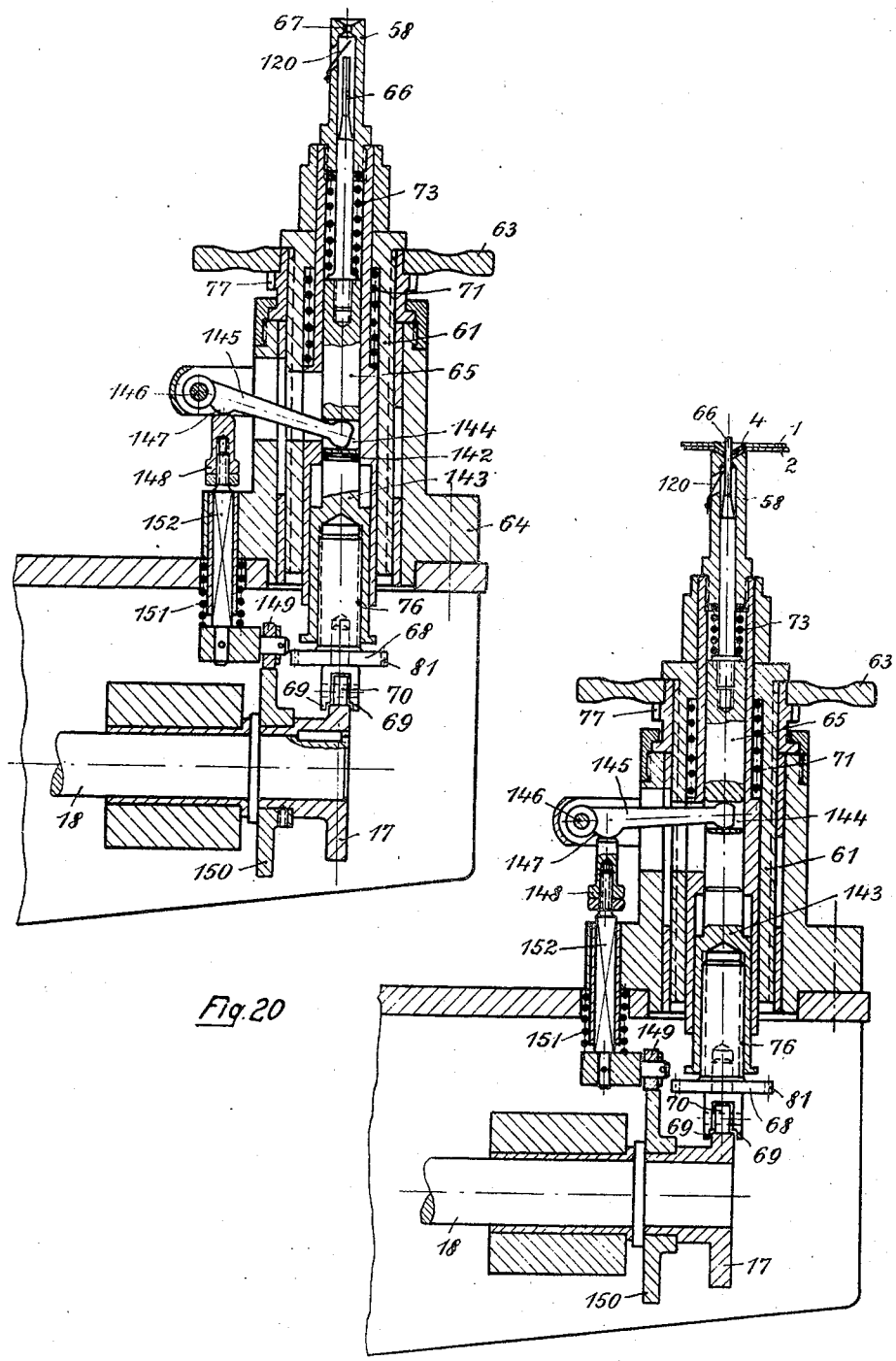

Patented Aug. 22, 1944

2,356,526

UNITED STATES PATENT OFFICE 2,356,526

RIVETING MACHINE

Friedrich Mayer and Franz Wopper, Regensburg, Germany; vested in the Alien Property Custodian Application November 12, 1941, Serial No. 418,834
In Germany December 19, 1939

16 Claims. (Cl. 78—48)

This invention relates to certain improvements regarding the production of flush or countersunk riveted joints and has special reference to riveted joints of the type in which metal sheets are conically bent or depressed to form a countersunk rivet hole for reception of a countersunk rivet head, while the opposite rivet head is of special shape to conform to the conically projecting complementary portion of the metal sheets.

It is an important object of the present invention to provide means and methods for producing riveted joints of the type referred to which are reliable and can be made with relatively simple tools. High quality of the riveted joints and low cost of production are to be demanded for mass production of such riveted joints, which may be used, e. g., in the manufacture of aircraft parts.

Another object of the invention is to provide means permitting the use of countersunk rivets of normal type whose countersunk head forms the swage or die head while the special head conforming to the conically projecting portions in the metal sheets is made as the closing or snap head.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which:

Fig. 1 is a section through a joint to be riveted according to the present invention, as the rivet is being introduced.

Fig. 2 is a similar section of the finished riveted joint.

Fig. 3 is a similar section showing a modified form of closing head.

Fig. 6 is a front elevation of the upper part of the machine, on a larger scale.

Fig. 7 is a vertical central section through the lower part of the machine.

Fig. 8 is a front elevation of the lower part of the machine.

Fig. 9 is a horizontal section through the upper part of the machine on line IX—IX of Fig. 6.

Fig. 12 is a vertical section, on the scale of Figs. 10 and 11, through the holder up with the rivet grip, the depressing matrix which acts as a snap set, and the metal sheets to be riveted, as the rivet is being gripped by the rivet grip.

Fig. 17 is a section similar to Figs. 12 to 16, but showing a rivet grip of modified construction, as it is gripping the rivet.

Fig. 18 is a section through the holder up and rivet grip as per Fig. 17 on arrival of the rivet under the holder up.

Fig. 19 is an elevation of the rivet tongs.

Fig. 20 is a vertical central section corresponding to that of Fig. 7, but showing a modified form of the lower part of the riveting machine, provided with two separate driving means for the filling stamp of the depressing matrix or snap set, the organs being shown in their positions shortly prior to the depressing and perforating operation.

Fig. 21 is a section similar to Fig. 20, but showing the organs in their positions after the quick advance of the filling stamp of the depressing matrix.

Figure 4:
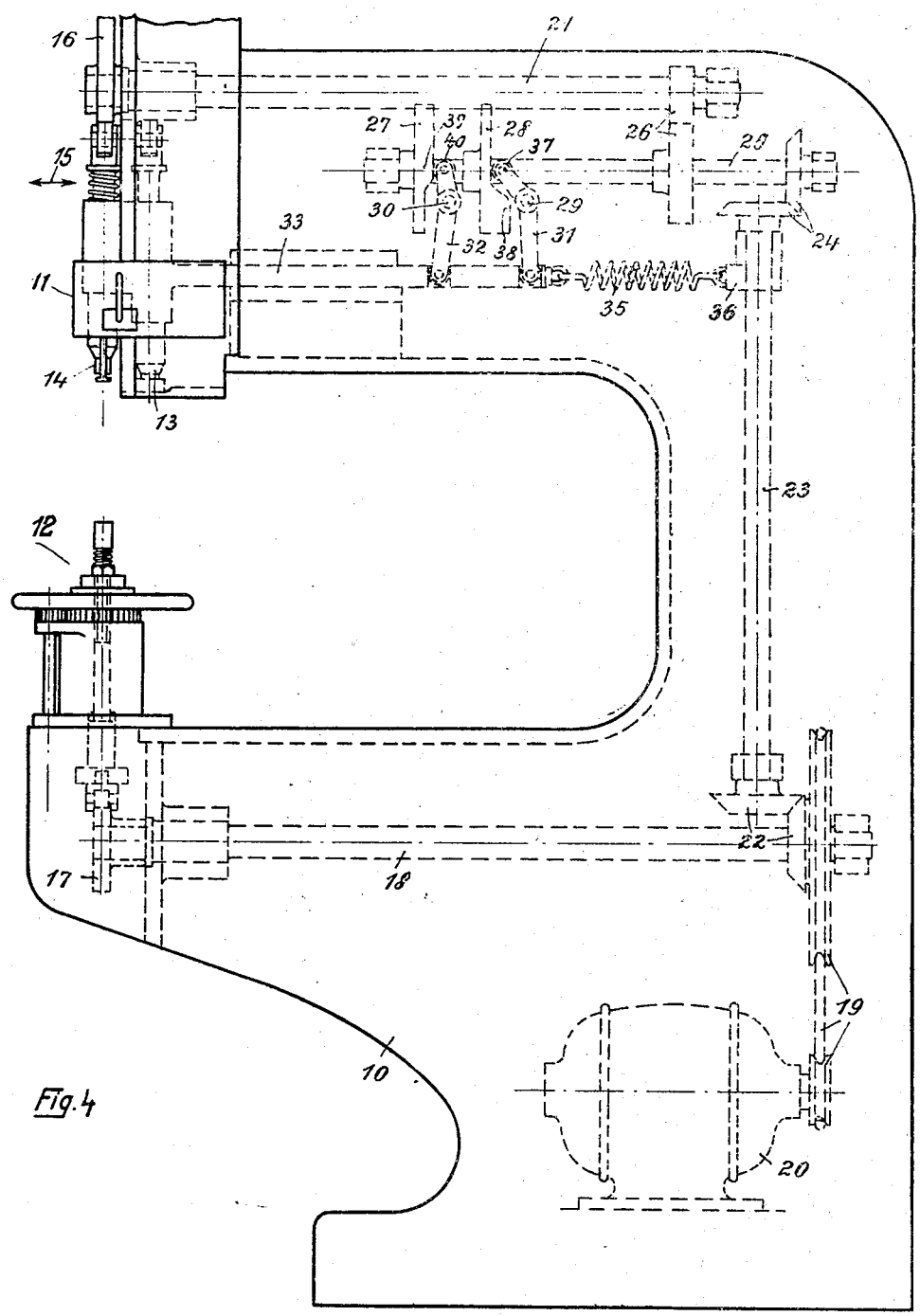
Fig. 4 is a side view of a sheet riveting machine having the invention applied thereto.

Referring now to the drawings in greater detail, and first to Fig. 1, it will be noted that the metal sheets 1 and 2 which are conically depressed at 3 and perforated at 4 are fitted with an ordinary countersunk rivet 5 having a plain conically countersunk head 6 forming the swage or die head. The closing or snap head is produced at the under side of sheet 2, by clinching or driving, and as shown in Figs. 2 and 3 is shaped conically both at its inner face 7, conforming to the shape of the conical projection in the sheets, and at its outer face 8. The rivets of Figs. 2 and 3 differ from each other regarding the shape of their closing heads. In the embodiments of Fig. 2 the acute angle $\beta$ of cone 8 is equal to the acute angle $\alpha$ of cone 7, the two angles amounting to about 120°, while in the form of Fig. 3 angle $\alpha$ of cone 7 is again about 120°, while angle $\beta$ of cone 8 is substantially smaller, i. e., about 90°. In consequence of the smaller size of angle β in Fig. 3 the metal material which is displaced radially outwards when clinching the closing head is more intensively diverted towards the sheets to be riveted than in Fig. 2, with the result that the pressure exerted by the rivet at its edge 9 is higher. The shape of Fig. 2 on the other hand offers considerable advantages regarding the construction of the riveting tools, since it permits using the depressing matrix which serves to produce the conical bend in the sheets 1 and 2 as a snap set in the further course of the riveting operation.

Fig. 4 is a general view of a riveting machine having the invention applied thereto. The upper and lower riveting tools 11 and 12, respectively, are mounted in a C-shaped machine frame 10. The upper tool arrangement substantially comprises two tools lying side by side, i. e., the depressing die 13 and the holder-on 14. The lower tool arrangement on the other hand forms a unit which during the depressing and perforating operations serves as a depressing and perforating matrix and during the riveting operation serves as a snap set. The two tools 13 and 14 of the upper tool system 11 are alternately moved into alignment with the axis of the lower tool system 12 by moving them in the direction of arrow 15. To this end, the tools 13 and 14 are mounted on a slide 33 seated in a guide 34. The tools of the upper and lower tool systems 11 and 12 are operated by cams 16 and 17. Cam 17 is secured on a shaft 18 which can be driven from a motor 20, through a belt drive 19, while cam 16 is secured on a shaft 21 which can be driven from shaft 18 through a pair of bevel wheels 22, a vertical shaft 23, a pair of bevel wheels 24, a horizontal shaft 25 and a pair of gear wheels 26. Seated on the horizontal shaft 25 which is supported in the upper part of frame 20 are also cams 27 and 28 (see also Fig. 5) which serve to control the horizontal motions of the upper riveting tools 13 and 14, by actuation of two double-armed levers 31 and 32 pivoted at 29 and 30, respectively. The lower arms of said levers engage into recesses in a rearward projection of slide 33. A helical spring 35 which at one end is hooked into an eyelet of the slide projection and at its other end is anchored to a member 36 of the frame tends to pull slide 33 towards shaft 23. When the roller 37 provided on the upper arm of lever 31 is engaged by the operating portion 38 of cam disc 28, the two-armed lever 31 is swung around its fulcrum 29 in such a manner that its lower arm moves slide 33 forward, thereby moving tool 13 into alignment with the lower tool 12 and with cam disc 16, against action of spring 35. On engagement of roller 37 with cam 38 the operating portion 39 of cam disc 27 has cleared the roller 40 of two-armed lever 32, so that the return of slide 33 may take place without interference by lever 32. When with further turning of shaft 25 roller 40 is going to run up again on the opposite end of cam portion 39, cam portion 38 has cleared roller 37, thus permitting return of slide 33 as roller 40 is operated by cam portion 39.

The tools 13 and 14 are provided with rollers 41 and 42 acted upon by cam disc 16. Roller 41 is mounted for rotation on a shaft 41' fixedly supported in a rod member 43 which at its lower end carries the punch 44 fixedly connected to it. Said lower end moreover is surrounded by a member 45 forming the depressing die for depressing the sheets at 3, Fig. 1 and being connected with member 43 through a pin 46 forming part of a pin and slot connection 46, 47 which permits a relative movement of die 45 with respect to punch 44 limited by the length of slot 47. Inserted between members 43 and 45 is a helical spring 48 which is so rated as to its tension that the members 43 and 45 during the depressing operation form a rigid unit. When the depressed sheet has been engaged by the depressing die 45, the latter is stopped from further movement, so that only member 43 with punch 44 can be advanced downwards.

The tool 13 on its under side has an annular holding down clamp 49 which is acted upon by a helical spring 50 and serves to hold the sheets down. A helical spring 51, seated in a recess of slide 33 permanently tends to press member 43 with roller 41 upwards so that roller 41 is permanently held in engagement with cam disc 16 during position of tool 13 under said cam disc 16.

The main part 52 of tool 14 is of relatively simple shape, terminating in a cylindrical portion 53 which during the riveting serves as a holder-on or stationary rivet die. A helical spring 54 permanently urges member 52 upwards. Mounted on a pin 55 of member 52 is a rivet grip 118 which in Fig. 5 holds a rivet 5 under holder-on 53.

Fig. 6 shows the shape of the cam disc 16 operating the tools 13 and 14.

The details of the lower tool system of the riveting machine will be seen from Figs. 7 and 8. It will be noted that the depressing matrix 58 forming the main part of this system and serving also as the snap set as above mentioned, is formed with a conical depression or recess 57 and at 59 is threadedly engaged with a sleeve 60 which in turn is slidable in a sleeve 61 that is provided with a screw thread 62 over its entire length, for engagement with a female thread of a hand wheel 63 mounted to turn but secured against sliding in a stationary casing member 64. Turning the hand wheel 63 therefore causes axial shifting of sleeve 61, whereby the tools of the riveting machine can be adjusted in accordance with the thickness of the sheets or other articles to be riveted. Sleeve 60 encases an interior member 65 terminating in a cylindrical portion 66 of smaller diameter which in the riveting operation serves to fill up the bore 67 of matrix 58, thus acting as a "filling stamp."

Screwed into the inner member 65 is a carrier 68 for the forked bearing 69 of a roller 70 which cooperates with a cam disc 17 mounted on the front end of shaft 18. The shape of cam disc 17 is represented in Fig. 8.

As long as roller 70 is engaged with the low portions of the operating edge of cam disc 17, the upper flange 72 of sleeve 60 under action of a helical spring 71, whose upper end bears on member 61, leans against member 61, thereby taking up its respective bottom position. When roller 70 is lifted by cam 17, there is at first lifted the interior part 65 with the filling stamp 66 only, against action of helical spring 73, while sleeve 60 remains in its initial position. As the outwardly projecting shoulder 74 of member 65 strikes against the inwardly projecting shoulder 75 of sleeve 60, the latter is also taken along, and, as a result, the depressing matrix 58 and the filling stamp 66 rise jointly to form the snap head of the rivet.

The vertical adjustment of sleeve 61 enacted by hand wheel 63 in order to ensure permanent contact of roller 70 with cam 17 requires a readjustment by changing the overall length of member 65 including members 68 and 70. To this end, the carrier 68 for the roller is threadedly seated in member 65, at 76. The hand wheel 63 is formed with a toothed portion 77 meshing with a pinion 79 mounted on a vertical shaft 78 which through a toothed wheel 80 of considerable width transmits the rotation to a toothed rim 81 on carrier 68, thereby screwing the latter more or less into the threaded bore of member 65. Owing to the large width of toothed wheel 80 permanent meshing thereof with the toothed rim 81 is ensured irrespective of the vertical sliding of the toothed rim 81 caused by rotation of cam disc 17.

The forked bearing member 69 of roller 70 is shaped to overhang cam 17 slightly at its sides so as to be held against participation in the turning motion of its carrier 68.

The depressing matrix 58 is surrounded by an annular holding down member 83 which is forced upwards by a helical spring 82.

Figs. 6 and 9 of the drawings illustrate also a device combined with the riveting machine and serving to produce the countersunk rivets. The rivets are made of wire rods 84. A single wire rod is fed through the channel 85 and the bore 86 in the machine frame, by means of a feeder 87 whose forward end abuts the extreme end of the wire rod 84 while its opposite end is shaped as a ring 88 for anchorage of one end of a helical spring 89 whose other end is secured to the casing of the machine by means of a headed screw 90, thereby exerting upon the feeder 87 a pull towards the center of the machine. The feeder 87 transmits this force on the wire rod 84 which thus is permanently acted upon by a force tending to advance it, and forced through the bore 86 of the stationary member 91 as well as through the bore 92 of member 93 secured on member 91, into engagement with a slide 94 which is horizontally slidable on member 93 from the front to the rear and vice versa, under control of a cam disc 96 which is mounted on shaft 116 and operates a two-armed lever 100 which is mounted on a stationary pivot 97, and by means of a roller 98 on its upper arm engages cam disc 96 while its lower arm engages into a slot 99 of slide 94. The cam disc 96 cooperates with a compression spring 101, whose rear end is seated in a stationary recess of the machine casing while its front end acts upon the rear end of slide 94.

Slide 94 has a bore 102 which in one end position of the slide is located between the pressure die 103 and the ejector 104, Fig. 9, and in the other end position of the slide is located above bore 92 of member 93, this being the position which in the course of the complete cycle of operations for finishing one rivet is taken up first. The wire rod 84 in this case is advanced by the feeder 87 until it strikes against a stationary stop 105 which thus defines the length of feed and ensures the formation of a rivet of predetermined length.

After advance of the wire rod 84 the slide 94 is urged forward by cam disc 96, the two bores 102 and 92 exerting a shearing action upon wire 84 and cutting off the advanced length of wire. The severed length of wire is taken along by the advancing slide 94 and brought under the rivet pressing die 103 provided on the outside of the machine casing in the slide 33 carrying the tools 13 and 14, in a horizontal position. Through a helical spring 106 die 103 is pressed outwards from the center of the machine, for engagement of a roller 107 on its end with the cam disc 108 secured on shaft 109 and shaped as shown in Fig. 6. When roller 107 of pressing die 103 is operated by the cam, die 103 is advanced towards the severed end of wire rod 84, against action of spring 106, deforming the extreme end of the severed length of wire to a conical swage head in the conically recessed die 110 on slide 94.

The undriven or unclinched rivet thus finished is ejected from slide 94 by ejector 104 which is held in its inoperative position by a helical spring 111 and operated by action of a two-armed lever 113 fulcrumed on a stationary portion of the machine at 112 and controlled by engagement of its roller 114 with a cam 115 on shaft 116, its lower end engaging into a recess 117 of the thicker portion of ejector 104. The ejector advances the finished rivet so far that it can be seized by the grip 118, Fig. 12.

The shafts 109 and 116 carrying the cam discs 108 and 115 are driven from shaft 21, shaft 116 being driven through the toothed wheels 153, 154, 155, and shaft 109 being driven through toothed wheels 156, 157, 158.

Figure 10:
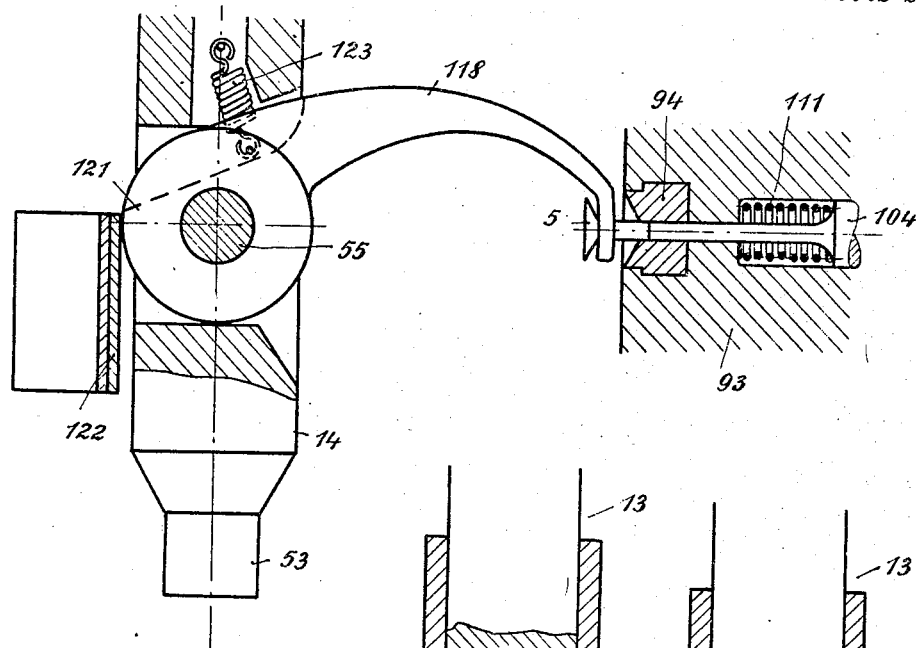
Fig. 10 is a vertical section on a still larger scale, showing the upper and lower dies for perforating and depressing the metal sheets, the parts being shown at the instant immediately before engaging the metal sheets.
Figure 11:
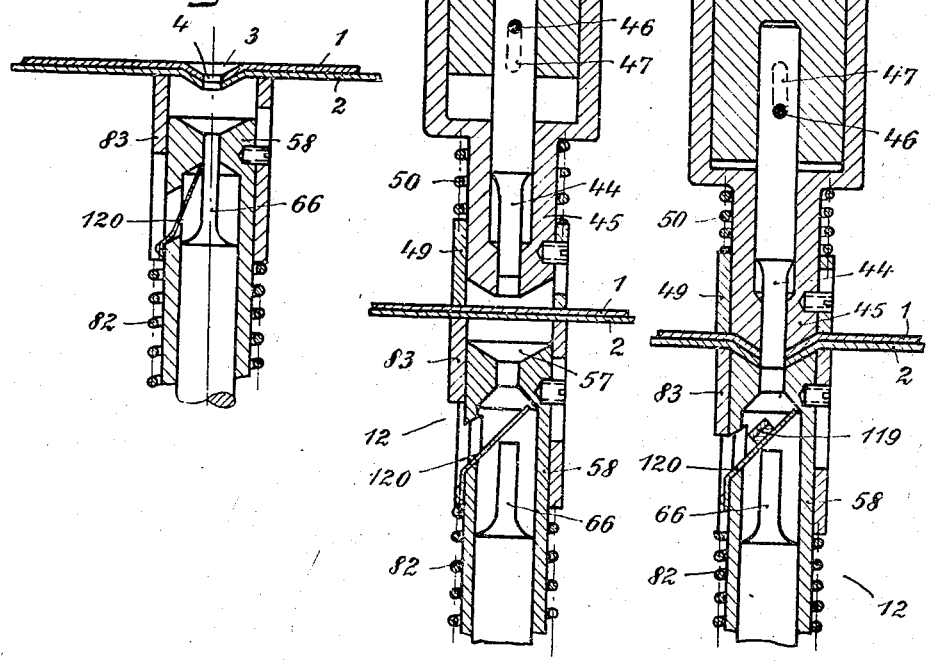
Fig. 11 is a section like Fig. 10, but showing the parts in their positions after the perforating and depressing action has been finished.

The operations carried out in the course of the production of the riveted joint will be seen from Figs. 10 to 18. In Fig. 10 the tool 13 of the upper tool system has just engaged the sheets 1, 2, which are to be riveted, so that the same are held between the holding down clamp 49 of tool 13 and the holding down clamp of the lower tool system 12. The springs 50 and 82 are compressed by the downward motion of the depressing die 45, and the conically projecting portion thereof approaches the conical recess 57 of the depressing matrix 58, thereby deforming the portions of sheets 1 and 2 between the members 49 and 83 into a conical shape. The downward stroke of die 45 is defined by engagement of sheet 2 with the conical walls of recess 57, only the punch 44 advancing further during the further downward stroke of tool 13, thereby striking against the sheets 1, 2, and perforating the same, as shown in Fig. 11. The small disks 119 punched out fall upon a guide sheet 120 arranged in the depressing die 58 in an inclined position, sliding outwards thereon.

Figure 5:
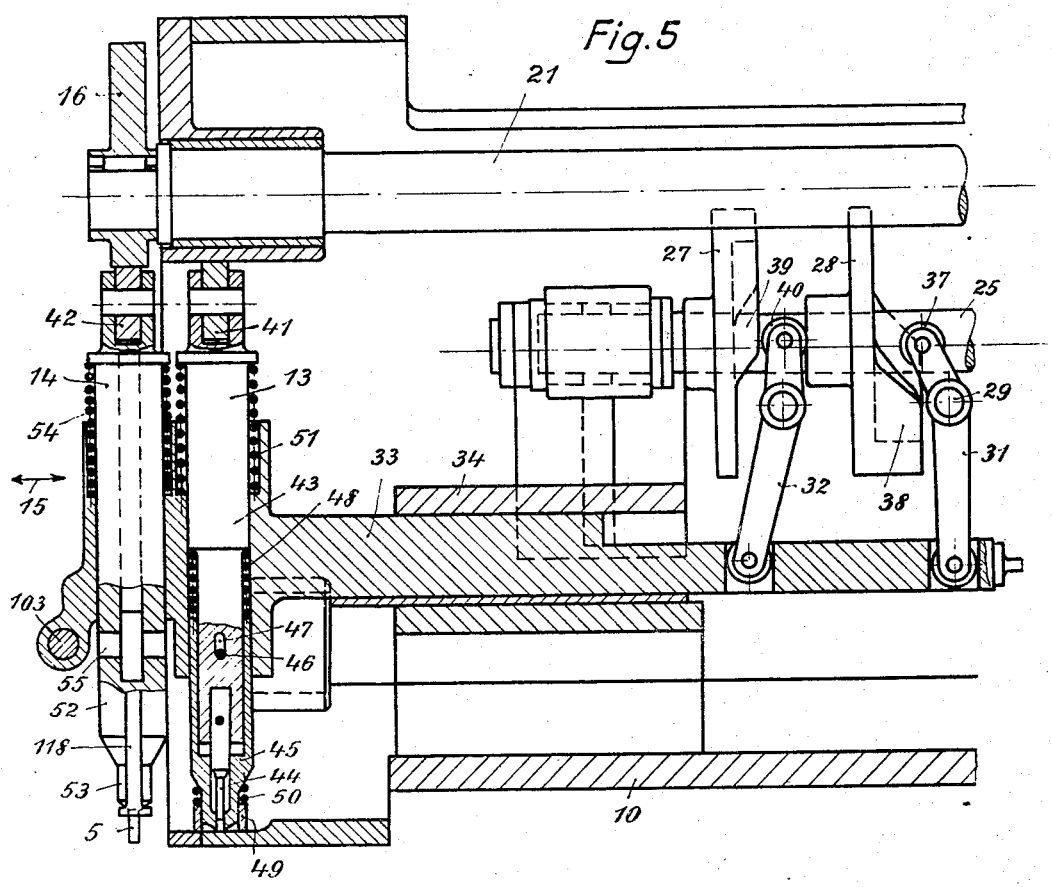
Fig. 5 is a vertical central section of the upper part of the machine, on a larger scale.

After the depressing and perforating operations have been finished, the tool 13 is retracted, and slide 33 is moved rearwards to bring tool 14 under driving cam 16, Fig. 5. Wen this tool 14 is moved downwards, Fig. 12, the hub 121 of rivet grip 118 pivoted at 55 at first contacts a friction surface 122, with the result that the rivet grip 118 is swung clockwise, the extreme end of grip 118 engaging the unclinched rivet 5 which has just been made and in this moment is ejected from slide 94 by ejector 104. The swinging motion of grip 118 is counteracted by a helical spring 123 whose extreme ends are anchored at the grip and in the interior of tool 14, respectively.

Figure 13:
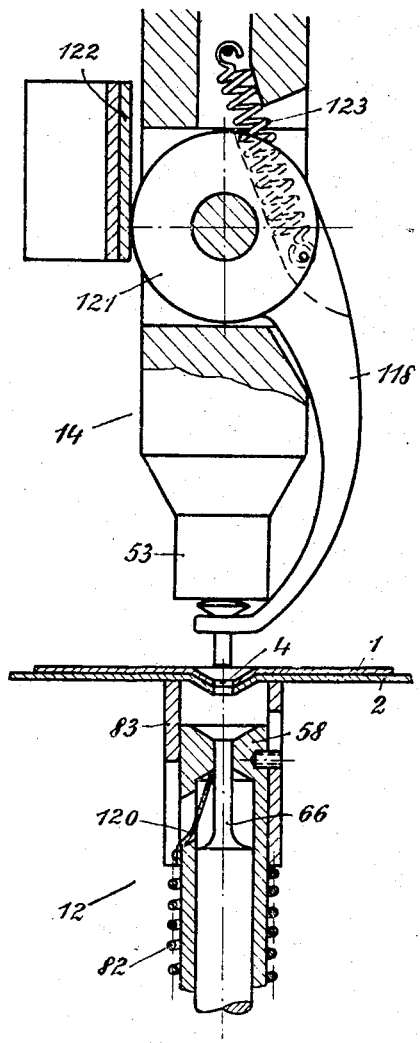
Fig. 13 is a section the same as Fig. 12, but showing the parts on arrival of the rivet at the riveting point.
Figure 14:
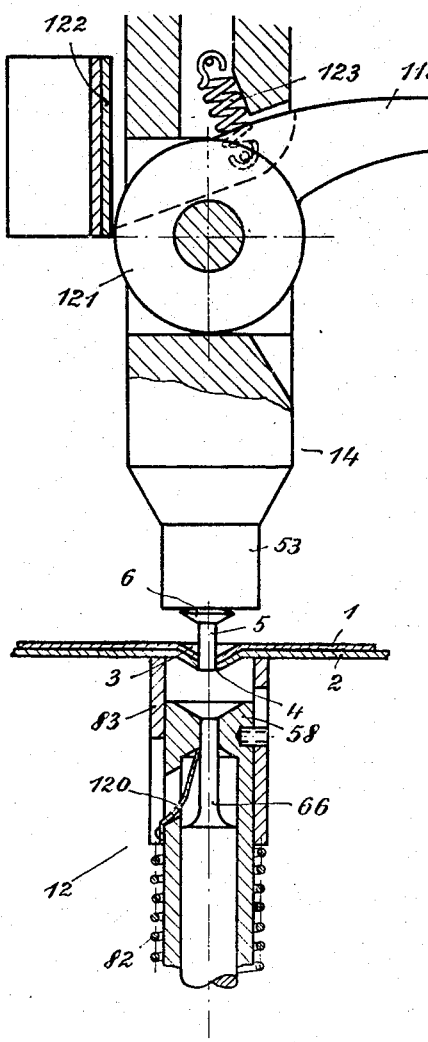
Fig. 14 is a section similar to Fig. 13, but showing the rivet being pushed through the rivet hole in the sheets.

During the further downward movement of tool 14 the swinging motion of the rivet grip 118 is completed by cooperation of hub 121 with the frictional surface 122. Fig. 13 represents the position of the members as the rivet grip has just brought the rivet 5 to a point above rivet hole 4 of sheets 1, 2. During further downward motion hub 121 disengages the frictional surface 122, Fig. 14, whereby spring 123 comes into effect, pulling the arm of grip 118 upwards with a considerable acceleration. The rivet 5 in this instant has entered the hole 4 of sheets 1, 2, and is now pushed down by tool 14 through the rivet hole until its swage head 6 engages the wall of the conical recess 3 of sheets 1 and 2.

Figure 15:
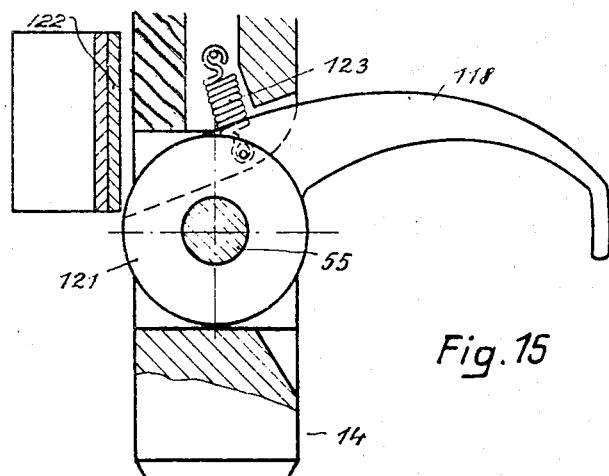
Fig. 15 is a section similar to Figs. 12 to 14, but showing the position of the parts after the closing head has been formed, the depressing matrix or snap set being advanced with the filling stamp moved to its top position.

The holding-on member 53 which is now in contact with sheet 1 presses the holding down clamp 83 downwards against action of spring 82, Fig. 15, whereby the shank of rivet 5 protruding beyond the lower edge of hole 4 strikes against the depressing matrix 58 which now acts as a snap set, its central bore being filled up by the filling stamp 66 which in its upward motion has moved the guide sheet 120 aside. As the rivet shank engages the snap set 58, 66, the snap head with its two conical faces 7 and 8 is formed. The two conical faces 7 and 8 thus formed have equal cone angles.

Figure 16:
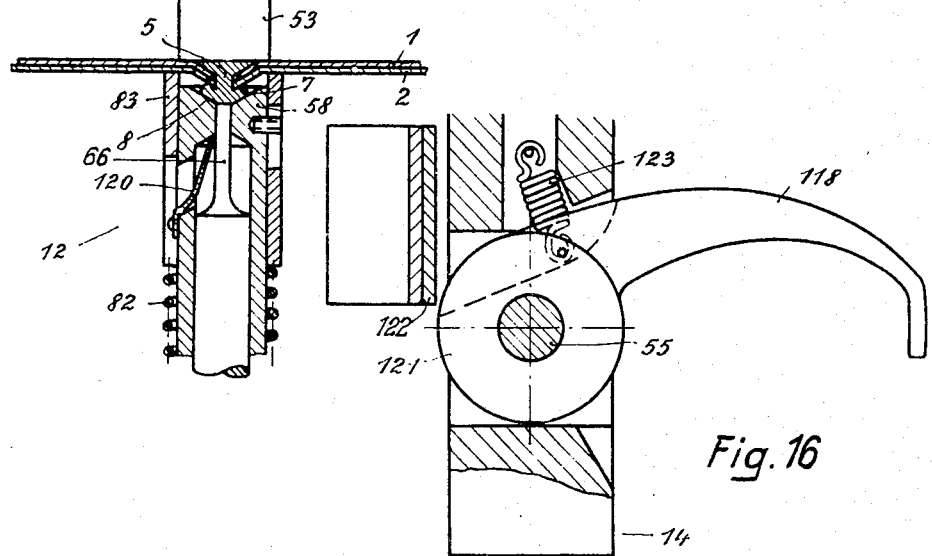
Fig. 16 is a section similar to Figs. 12 and 15, showing the position of the parts at an instant shortly prior to the finishing of the snap head, the filling stamp of the snap set taking up its end position in the bore of the depressing matrix only in the course of the formation of the snap head.

By way of alternative, the lower tool system 12 of the riveting machine may act in a manner somewhat different from that described with reference to Fig. 15, so as to provide another cooperation of the filling stamp 66 with the depressing matrix 58. In Fig. 15 it has been assumed that the filling stamp 66 on engagement of the shank of rivet 5 with the snap set already takes up that position in which it fills up the bore of the snap set completely. In Fig. 16 another kind of cooperation has been assumed as between the members 58 and 66. When the shank of the rivet strikes against the snap set 58 as the holder-on 53 goes down, the filling stamp is not yet in its upper end position in the bore of the snap set, but in a lower position, so that the rivet shank at first enters the bore of snap set 58, while the complete filling up by the filling stamp 66 of this bore takes place only in the further course of the clinching operation. This mode of operation of the members 58 and 66 indeed requires a greater force than that described with reference to Fig. 15, but it offers the advantage that the shank of rivet 5 is clinched or upset more intensively, which is a desirable effect.

Figs. 17 to 19 represent a modified form of the rivet grip 118 which is connected with tool 14. The idea underlying this modified construction of the rivet grip is to provide a safeguard to ensure that the rivets always take up the correct position in the rivet grip and troubles are reliably excluded when placing the rivets under the face of the holder-on 53. To this end, a separate arm 124 is mounted to swing on a pin 125 of the main body of the grip 118 and influenced towards a stop 127 of the main grip body by a spring arrangement 126.

This arm 124 of grip 118 at its forward end carries a stop plate 128 which is mounted on a guide rod 129 and pressed outwards by a helical spring 130. When it does not meet with resistance on its outer face, plate 128 is advanced until pin 131 at the rear end of rod 129 strikes against washer 132, but it is capable of yielding against action of spring 130 when a rivet is ejected by ejector 104 from slide 94. After rivet 5 by further motion of grip 118 has been removed from the reach of slide 94, spring 130 by means of plate 128 advances the rivet until its swage head comes to lie on the inner face of the grip tongs 133. In this manner it is ensured that all consecutive rivets are seated in the same position in the grip tongs, which as seen from Fig. 19 consist of two relatively swingable arms 134, 135, mounted on a pin 136 and compressed by a spring (not shown).

In the embodiment shown in Figs. 17 to 19 the swinging motion of the main grip body 118 is caused by a pawl 137 which is swingable on a pivot 138 in the hub portion 121 and in the downward motion of tool 14 strikes against a stationary stop 139, thereby causing the grip 118 to carry out a clockwise swinging motion.

Since the rivet 5 has to be placed under the holder-on body 53 of tool 14 in such a manner that the upper face of its swage head touches or nearly touches the front face thereof, the stop member 128 is in the way of the rivet when it is intended to place the same under the holder-on. It must be capable of receding to permit this operation. To this end, the grip is provided with the swingable arm 124 on which stop 128 is mounted. When moving the rivet under member 53, the lower free end of arm 124 will strike against member 53, thereby receding against action of springs 126. When the tool 14 has reached the position shown in Fig. 18, rivet 5 already has been introduced slightly into the rivet hole 4 so that it may be left alone with the holder-on member 53 which continues to move. Grip 118 therefore can disengage itself and return to its initial position, under action of helical spring 123 which is now allowed to act since pawl 137 has left the reach of the stationary stop 139. The bevelled lower face 140 of stop 139, permits upward swinging of grip 118 and pawl 137 in an anticlockwise direction. At the beginning of this return swinging motion spring 123 is supported by the springs 126, until arm 124 has reengaged stop pin 127. The upward stroke of tool 14 is not impeded by pawl 137 and stop 139 since pawl 137 is capable of receding or yielding with respect to stop 139 towards the interior of tool 14.

Figs. 20 and 21 illustrate a modified form of the lower tool system, the changes relating to the construction of the filling stamp 66 and its drive. It has been found that in case of inattention on the part of the operator of the machine a displacement of the sheets to be riveted with respect to the lower tool system may easily occur in the interval between the operations of depressing and perforating the sheets and the real riveting operation, whereby disturbances may be caused. This possible defect is eliminated in the construction shown in Figs. 20 and 21 in such a manner that the filling stamp filling up the bore of the depressing matrix is raised already during the return of the perforating punch of the upper tool system, following this punch and passing through the perforated sheets, thereby holding the same in their correct positions until it recedes during the downward motion of the holder-on with the rivet, now taking up the position required for the riveting operation.

It will be understood that the filling stamp in this case has to carry out a quick motion with small force in the first phase of the cycle of operations and a slower motion with great force in the second phase thereof. These contradicting requirements are fulfilled in the embodiment of Figs. 20 and 21 by the provision of two driving cams for the filling stamp. One of said cams lying in the working axis actuates the filling stamp directly, while the other one acts upon the stamp through a lever arrangement. The guiding portion of the filling stamp is divided at 142 into two parts 65 and 143. The cam disc 17 corresponding to that of Figs. 7 and 9 through roller 70 and roller carrier 68, as well as through the lower part 143 and the upper part 65 acts directly upon the filling stamp 66. The free end of a single-armed lever 145 pivoted at 146 and engaging into a recess 144 of the upper guiding portion 65 cooperates by its face 147 with a lifter or slide 148 which is guided in casing 64, its lower end by means of a roller 149 engaging a second cam disc 150, under action of a helical spring 151. The lifter 148 is secured against turning by a portion 152 of quadrangular cross section.

When the roller 149 runs up on cam 150, the lifter 148 is lifted, raising lever 145 also. In consequence of the lever ratio the free end of the lever travels through a relatively long way. This is also true for the filling stamp with its guiding portion 65, which is lifted off from the lower portion 143, the filling stamp 66 thereby passing through the bore 67 of the depressing matrix or snap set 58 and the hole 4 of sheets 1 and 2, Fig. 21, and securing the sheets in position with respect to the lower tool system. As the tool 14 with the holder-on 53 and the rivet moves down, the filling stamp 66 yields, clearing hole 4. Its return motion comes to a standstill when its upper end face has reached the upper end of bore 67 of the depressing matrix 58 which is lifted by the cam disc 17, whereby the surface 142 of member 143 approaches the bottom face 142 of member 65. As member 65 contacts member 143, the depressing matrix 58 and the filling stamp 66 are moved on jointly. The force occurring at the filling stamp 66 when clinching the closing head of the rivet is transmitted to the cam disc 17 in a straight direction.

In consequence of the transmission through lever 145 large strokes of the filling stamp 66 can be attained with cam curves of moderate slope.

The possibility offered according to the present invention of using rivets having a normal conical swage head offers various additional advantages. Where riveted joints are made on aircraft parts the swage head is usually located at the outside. As is well known, the outside of aircraft parts in order to attain favourable aerodynamic conditions must be made as smooth as possible, avoiding projections and recesses. It follows that for making countersunk riveted joints on aircraft parts it is important to press the countersunk head with sharp edges, in order to fill up the recess in the depressed sheets completely. The sharper the edges of the swage head are made the more accurately the recess can be filled up. The sharp pressing of the swage head however required a considerable amount of pressing which as experience has taught is higher than that required for producing the snap head which is conically shaped on both sides. Therefore, if the countersunk head is formed in the riveting operation, as a snap head, large forces have to be produced by the riveting machine and the same accordingly must be of heavy construction. The large forces to be applied involve the risk of jamming the sheets. The danger is particularly important with thin light metal sheets.

The above mentioned drawbacks are avoided by making the riveted joint according to the present invention. Since it serves as a swage head, the countersunk head can be made neatly in a separate operation from the real riveting process, by special rivet producing devices. The real riveting machine can be of lighter construction, since it has to produce smaller forces only to form the snap head with two conical faces. The production of a riveted joint which is flush at the outside is ensured. The danger of jamming the sheets to be riveted is avoided by the use of moderate clinching pressures which are sufficient to close the roof-shaped or double cone snap head.

The provision of the upper tool system in a movable slide for cooperation with a stationary lower tool system offers the advantage that the machine is readily adaptable to the varying shapes of the workpieces, e. g., bodies having a flush surface on one side and large projecting portions, for instance, stiffening ribs, on their opposite side.

The method and apparatus of the present invention have been described in detail with reference to specific embodiments. It is to be understood, however, that the invention is not limited by such specific reference but is broader in scope and capable of other embodiments than those specifically described and illustrated in the drawings.

We claim:

1. A sheet riveting machine comprising in combination a depressing die and a complementary matrix for producing conical depressions in the sheets to be riveted, a punch cooperating with said matrix for producing a rivet hole in the center of each depression, said matrix having a central bore for cooperation with said punch in the perforating operation, and a holder-on tool operable from the same side as said depressing die and cooperating with said matrix which is adapted to act as a snap head die in the riveting operation, for producing a snap head having inner and outer conical faces, and to this end is provided with a filling stamp adapted to fill up its central bore during the riveting operation, for using said matrix as a snap head die.

2. A sheet riveting machine comprising in combination a depressing die and a complementary matrix for producing conical depressions in the sheets to be riveted, a punch cooperating with said matrix for producing a rivet hole in the center of each depression, said matrix having a central bore for cooperation with said punch in the perforating operation, a holder-on tool operable from the same side as said depressing die and cooperating with said matrix which is adapted to act as a snap set for a snap head having inner and outer conical faces, and to this end is provided with a filling stamp movable in its central bore, and controlling means for moving said filling stamp in such a manner that said central bore during the whole clinching operation is completely filled up on its end facing the rivet.

3. A sheet riveting machine comprising in combination a depressing die and a complementary matrix for producing conical depressions in the sheets to be riveted, a punch cooperating with said matrix for producing a rivet hole in the center of each depression, said matrix having a central bore for cooperation with said punch in the perforating operation, a holder-on tool operable from the same side as said depressing die and cooperating with said matrix which is adapted to act as a snap head die in the riveting operation, for producing a snap head having inner and outer conical faces, and to this end is provided with a filling stamp movable in its central bore, and controlling means for moving said filling stamp in such a manner that at the beginning of the riveting operation it does not completely fill up said central bore at its end facing the rivet while it is advanced to its end position in said central bore in the course of the riveting operation.

4. A sheet riveting machine comprising in combination a machine frame, an upper tool system and a lower tool system, the upper tool system comprising a slide transversely movable in said frame and carrying a depressing die for producing conical depressions in the sheets to be riveted, a punch for producing a rivet hole in the center of each depression, and a holder-on tool, said parts being alternately movable into working position by shifting said slide, and the lower tool system being stationarily arranged and comprising a complementary matrix for said depressing die provided with a central bore for cooperation with said punch, and a filling stamp movable in said central bore for filling up said central bore during the riveting operation in which said matrix is used as a snap set.

5. A sheet riveting machine comprising in combination a machine frame, an upper tool system and a lower tool system, the upper tool system comprising a slide transversely movable in said frame and carrying a depressing die for producing conical depressions in the sheets to be riveted, a punch for producing a rivet hole in the center of each depression, a holder-on tool, and means including a swingable arm and a rivet grip for automatically feeding the rivets to said rivet hole and introducing the rivet into the rivet hole with its countersunk swage head fitting said depression, said parts being alternately movable into working position by shifting said slide, and the lower tool system being stationarily arranged and comprising a complementary matrix for said depressing die provided with a central bore for cooperation with said punch, and a filling stamp movable in said central bore for filling up said central bore during the riveting operation in which said matrix is used as a snap set.

6. A sheet riveting machine as claimed in claim 5, comprising also a stop member defining the position of the rivet in the rivet grip.

7. A sheet riveting machine as claimed in claim 5, comprising also a stop member movably mounted on the swingable arm and held resiliently in its working position.

8. A sheet riveting machine as claimed in claim 5, comprising also a stop member movably mounted on the swingable arm and held resiliently in its working position to be capable of yielding in an axial direction of the rivet in the rivet grip.

9. A sheet riveting machine as claimed in claim 5, comprising also a stationary stop member for the swingable arm, the portion of the swingable arm which cooperates with said stop member being mounted to yield in one direction after the manner of a pawl, so that said portion may give way for said stop member during return of the holder-on tool.

10. A sheet riveting machine comprising in combination a depressing die and a complementary matrix for producing conical depressions in the sheets to be riveted, a punch cooperating with said matrix for producing a rivet hole in the center of each depression, said matrix having a central bore for cooperation with said punch in the perforating operation, a holder-on tool operable from the same side as said depressing die and cooperating with said matrix which is adapted to act as a snap head die in the riveting operation, for producing a snap head having inner and outer conical faces, and to this end is provided with a filling stamp movable in its central bore, and controlling means for moving said filling stamp beyond the forward end of said central bore to engage the rivet hole and secure the sheets in position until the rivet is being introduced.

11. A sheet riveting machine as claimed in claim 10, comprising two separate controlling means for the filling stamp for alternately moving the filling stamp in different speeds.

12. A sheet riveting machine as claimed in claim 10, comprising also a lever transmission and two separate cam discs arranged side by side, one of said cam discs lying in the center axis of the filling stamp for operating it directly, while the second cam disc cooperates with said lever transmission to move the filling stamp at higher speed.

13. A sheet riveting machine as claimed in claim 10, comprising also a lever transmission and two separate cam discs arranged side by side, the filling stamp being divided across its axis into two parts and one of said cam discs lying in the center axis of the filling stamp for operating it directly, while the second cam disc cooperates with said lever transmission to move that part of the filling stamp only which faces the work piece.

14. A sheet riveting machine as claimed in claim 4 including a plurality of simultaneously driven cam shafts, cam means on one shaft for actuating the depressing die and the punch and holder-on-tool of the upper tool system, cam means on another shaft for actuating the matrix and the filling stamp of the lower tool system, lever means for moving said slide, and cam means on still another shaft for actuating said lever means to cause movement of said slide.

15. A sheet riveting machine as claimed in claim 4 including rotatably mounted cam means for actuating the depressing die and the punch and holder-on-tool of the upper tool system, other rotatably mounted cam means for actuating the matrix and filling stamp of the lower tool system, lever means for moving said slide to align one of the tools of the upper tool system with the lower tool system, still other rotatably mounted cam means for actuating said lever means to cause movement of the slide, and means for simultaneously rotating all of said cam means, said various cam means being arranged to cause actuation of the members of said tool system in succession to effect the clinching of a rivet.

16. A sheet riveting machine as claimed in claim 5 including means for forming rivets from rivet stock fed to said forming means, the forming means placing a formed rivet in position for engagement with the rivet grip, rotatably mounted cam means for actuating the depressing die, punch and holder-on-tool of the upper tool system, other rotatably mounted cam means for actuating the matrix and filling stamp of the lower tool system, lever means for moving said slide to align one of the tools of the upper tool system with the lower tool system, other rotatably mounted cam means for actuating said lever means to cause movement of the slide, still other rotatably mounted cam means and lever means for actuating said rivet forming means, and means for simultaneously rotating all of said cam means, the various cam means being arranged to effect a cycle of operation of the rivet forming means and tool systems and slide wherein a rivet is formed, inserted in a perforation punched in the sheets and is clinched.

FRIEDRICH MAYER.
FRANZ WOPPER.